United States Patent [19]

Lynch

[11] Patent Number: 5,236,647
[45] Date of Patent: Aug. 17, 1993

[54] ELECTROSTATIC DISSIPATIVE MATERIAL AND PROCESS RELATING THERETO

[75] Inventor: George D. Lynch, Landenberg, Pa.

[73] Assignee: E. I. Du Pont de Nemours and Company, Wilmington, Del.

[21] Appl. No.: 880,771

[22] Filed: May 11, 1992

[51] Int. Cl.$^5$ .............................................. B29C 47/86
[52] U.S. Cl. .................................... 264/104; 252/500; 252/511; 264/105; 264/211.21; 264/331.15; 264/331.18; 264/327; 524/495; 524/586
[58] Field of Search ........... 264/104, 105, 108, 211.21, 264/331.15, 331.18, 327, 216; 252/500, 511; 524/186, 586, 495

[56] References Cited

U.S. PATENT DOCUMENTS

| | | | |
|---|---|---|---|
| 4,288,081 | 9/1981 | Sado | 264/108 |
| 4,548,740 | 10/1985 | von Tomkewitsch et al. | 264/105 |
| 4,552,687 | 11/1985 | Beacham et al. | 252/500 |
| 4,596,669 | 6/1986 | Kleiner et al. | 264/105 |
| 4,784,899 | 11/1988 | Ono et al. | 264/108 |
| 4,800,126 | 1/1989 | Leonardi | 264/45.3 |
| 5,017,260 | 5/1991 | Bardford | 156/273.3 |
| 5,112,528 | 5/1992 | Malone | 252/511 |

FOREIGN PATENT DOCUMENTS 0224811 7/1985 Fed. Rep. of Germany ...... 264/108

Primary Examiner—Jeffery Thurlow
Attorney, Agent, or Firm—Konrad Kaeding

[57] ABSTRACT

The present invention relates to compositions comprising conductive particles and one or more polymers, particularly acid copolymer resins or derived ionomers, which can be extruded or heat formed into films or articles. More specifically, the method of the present invention is directed to a novel, non-uniform heating process, wherein the edge portions of a material is heated about 3-50 degrees Celsius hotter than the center or middle portions of the article or film during fabrication to thereby provide improved and substantially uniform electrostatic dissipative ("ESD") properties.

5 Claims, 1 Drawing Sheet

ELECTROSTATIC DISSIPATIVE MATERIAL AND PROCESS RELATING THERETO

BACKGROUND OF THE INVENTION

1. Field of The Invention

The present invention relates to compositions comprising conductive particles and one or more polymers, particularly acid copolymers or ionomers which can be extruded or heat formed into films or coatings. More specifically, the heat processing of the present invention is directed to a novel, non-uniform heating method, wherein the edge portions of a material comprising acid copolymer and/or ionomer is heated 3-50 degrees Celsius hotter than the central or middle portion of the article or film during fabrication to thereby provide improved and substantially uniform surface resistivity properties.

2. Description of The Related Art

Plastics are often considered for use as electrical insulating materials, because they typically do not readily conduct electrical current and are generally rather inexpensive relative to other known insulating materials. A number of known plastics are sufficiently durable and heat resistant to provide at least some electrical insulating utility, but many such plastics are problematic due to the accumulation of electrostatic charge on the surface of the material.

Such surface charge accumulation can be undesirable for various reasons. Such materials sometimes discharge very quickly, and this can damage electronic components, or cause fires or explosions, depending upon the environment. Sudden static discharge can also be an annoyance to those using the material.

Even where sudden static discharge is not a problem, dust will typically be attracted to and will accumulate on materials carrying a static charge. Furthermore, the static charge can interfere with sensitive electronic components or devices and the like.

Resistivity can be defined as involving surface resistivity and volume resistivity. If the volume resistivity is in an appropriate range, an alternative pathway is provided through which a charge can dissipate (generally along the surface). Indeed, surface resistivity is typically the primary focus for electrostatic dissipating ("ESD") polymeric materials.

Surface resistivity is an electrical resistance measurement (typically measured in ohms per square) taken at the surface of a material at room temperature. Where the surface resistivity is less than or equal to about $10^5$, the composition's surface has very little insulating ability and is generally considered to be conductive. Such compositions are generally poor electrostatic dissipating polymeric materials, because the rate of bleed off is too high.

Where the surface resistivity is greater than $10^{12}$, the composition's surface is generally considered to be an insulator. In certain applications, such a composition is also poor electrostatic dissipating material, because the surface does not have the requisite amount of conductivity necessary to dissipate static charge. Typically where the surface resistivity is about $10^5$ to $10^{12}$, any charge contacting the surface will readily dissipate or "decay". Further information involving the evaluation of surface resistivity can be found in American Standard Test Method D257.

Acid copolymer resins are a well-known class of polymers containing up to about 30 weight percent organic acid groups which are attached to a hydrocarbon or perfluorinated polymer chain. Ionomers are derived from these acid copolymer resins by partial neutralization of the acid groups with metal ions, such as zinc, sodium, or magnesium.

Acid copolymers and ionomers generally have surface resistivities greater than $10^{12}$, and therefore these materials are generally not suitable for high performance ESD uses.

Static charge decay rates measure the ability of an electrostatic dissipating material to dissipate charge. A 90% decay time as used herein is measured at about 15% relative humidity and at ambient temperature as follows: A 5 kilovolt charge is placed upon the material and the amount of time (in seconds) for the charge to decrease to 500 volts is measured. A 99% decay time is measured substantially as for the 90% decay time, except that the amount of time measured is for the charge to dissipate to 50 Volts.

Many electrostatic dissipating materials generally found in the art have a 90% decay time of greater than about 3 seconds and a 99% decay time of greater than about 5 seconds. However, the National Fire Protection Association standard (NFPA Code 56A) requires 0.5 seconds as an upper limit for a 90% decay time, and the U.S. Military Standard (MIL-81705C) requires 2.0 seconds as an upper limit for a 99% decay time. Due to high surface resistivities, acid copolymer and ionomer compositions generally cannot meet such rigorous criteria as NFPA Code 556A or MIL-81705C.

Attempts have been made to coat an electrostatic dissipative material onto an insulating plastic to reduce the accumulation of static charge. However, surface applications have been problematic due to long term adhesion requirements and interference with surface properties.

Conventional low molecular weight organic electrostatic additives typically work well only in the presence of high relative humidity. Such additives typically must bloom to the surface after blending or mixing to provide electrostatic dissipative performance, and such blooming may not always be consistent. These additives may also cause thermal stability problems during processing or may cause physical properties of the produced film or coating to deteriorate. Such additives can also wash away or abrade from the surface.

High molecular weight (polymeric) electrostatic dissipating agents for plastic are known, but they can be expensive, can undesirably alter the properties of the material and can be difficult to blend or alloy into a polymer material.

OBJECTS OF THE INVENTION

It is therefore an object of the present invention to provide a high performance ESD material which has substantially uniform surface resistivity, even under conditions of low relative humidity.

A further object of the present invention is to provide an electrostatic dissipating material having a 90% decay time of less than about 0.5 seconds and a 99% decay time of less than about 2.0 seconds.

A further object of the present invention is to provide a high performance ESD material which does not have the problems associated with conventional ESD polymeric materials requiring high loadings of ESD modifying additives.

Other objects and features of the present invention will become apparent to one of ordinary skill in the art upon further reading of this specification and accompanying claims.

SUMMARY OF THE INVENTION

It has been surprisingly discovered that an acid copolymer or ionomer composition, can be loaded with conductive particles and unconventionally heat processed to provide a final film-type article having a substantially uniform electrostatic dissipative ("ESD") surface. The "heat processing operation" of the present invention is intended to include case film extrusion, extrusion coating, (including coextrusions with other materials) and the like.

The acid copolymer or ionomer compositions of this invention are made static-dissipative by incorporating a proper amount of a rigid conductive additive in particle or powder form, such as conductive carbon black, finely divided metals, conductive powders or combinations thereof. The examples will show that the amount of additive to obtain the desired level of surface resistivity is determined by the type of extrusion process, the line speed of the extrusion process, and the processing temperature. Despite control of these variables, it has been found that extrudates, such as a cast film of these compositions, generally do not have uniform surface resistivity across its entire width.

That is, with conventional flat cast film processing where the extrusion die is maintained at a uniform temperature across its width, the center portion may possess the desired level of surface resistivity, but the values approaching the outer edges of the film tend to increase and may exceed $10^{12}$ ohms per square. Generally, the practical consequence of this non-uniform surface resistivity level is that only the center portion of the extruded film has useful surface resistivity. Trimming of the film to the useful width results in loss of product and an increase in cost.

A typical flat film extrusion dies is often equipped with a series of individually-controlled heaters across its width. Surprisingly, it has been found that by setting the temperature of the die at higher values near the edges with respect to the center portion, a cast film which has uniform surface resistivity across its entire width can be produced.

Acid copolymers and ionomers, as with most plastics, are generally not capable of exhibiting turbulent flow. Hence, there is little intermixing as these resins flow through a heating process, but rather, the flow is generally quite laminar.

A portion of the molten polymer will flow and shear along the surface of the die or mold, whereas other portions of the molten ionomer will experience far less, if any, boundary interaction. It has been surprisingly discovered that the molten ionomer can be manipulated so that the surface will be sufficiently uniform after cooling to provide a final article or film which will exhibit substantially uniform ESD properties, making it useful for high performance ESD applications.

This is accomplished by modifying the temperature of different zones of the die. A final product having substantially uniform ESD properties can be obtained by adjusting the edge zones of the die or mold to be about 3 to 50 degrees Celsius hotter than the middle or center zone portions of the die or mold.

It is theorized that as the molten ionomer moves into or through an edge zone, the shear stress or other physical interaction caused by the edge zone onto the molten flow causes greater separation between the particles or agglomerates of the rigid conductive additives. This increased distance between the particles causes the increase in the surface resistivity of the extruded film at the edges. Plotting temperature versus resistivity, (based upon data provided in the examples herein), and shows that as processing temperature is increased the resistivity decreases. Further, (also based upon the examples provided below) shows that as line speed increases, resistivity increases, and it is therefore theorized that correlative particle distances generally lengthen as the speed increases. For any particular embodiment of this invention therefore, ordinary skill and experimentation may be necessary in determining the optimal line speed and extrusion temperature, depending upon the resin and conductive particles chosen and also the particle loading.

The increased heating at the outer zones reduces the melt viscosity and helps to maintain the average interparticle distance in the same range as in the center portion of the film or coating.

Coatings or films manufactured according to the process of the present invention exhibit substantially uniform ESD properties and are generally well suited for traditional, high performance ESD applications.

DETAILED DESCRIPTION OF THE PREFERRED EMBODIMENT

Particularly useful polymer compositions comprise poly(ethylene-coacrylic or methacrylic acid) (hereafter "acid copolymers") or their partial metal salts (hereafter "ionomers"). These resins bind well to the rigid additives of this invention, give superior adhesion to aluminum foil which is frequently used as a substrate, and possess oil resistance properties generally superior to that of conventional polyethylene.

The process of the present invention is particularly well suited for acid copolymers or ionomers, particularly in film and coating applications. The films of the present invention generally exhibit excellent toughness, adhesion and melt strength during processing.

Preferred heat processing methods include slot-die extrusion, extrusion casting or extrusion coating. In any of these common film manufacturing processes, a thin section of polymer melt is extruded from a slot die. Other materials may be coextruded with the compositions of this invention so long as the die temperature profile is maintained. The die gap may need to be mechanically adjusted in order to maintain uniform thickness of the film or coating.

In accordance with the present invention, the edge portions of the slot die are 3–50 degrees, more preferably 4–40 degrees and most preferably about 5–30 degrees Centigrade higher in temperature than the middle portions. For the preferred films of the present invention, the preferred die is conventional coat-hanger-design die with 5 or more heater zones. For the most preferred embodiment (polyethylene-comethacrylic acid ionomer resin having 4 weight percent carbon black), a line speed of about 50–100 meter per minute, the two outer zones are preferably operated at a temperature of about 210° C., the two outer intermediate zones are preferably operated at temperature of about 205°–210° C. and the middle zone is preferably operated at about 190° C.

Depending upon the composition chosen to be used, the optimal die temperature profile may need to be optimized using ordinary skill and experimentation. Optimization is dependent on resistivity measurements of the film or coating. Optimal die temperature profile is a function of the speed, melt viscosity and conductive particle loading. The extrudate exiting the slot die is typically quenched in a conventional manner, such as against a conventional chill roll.

Figure 1:
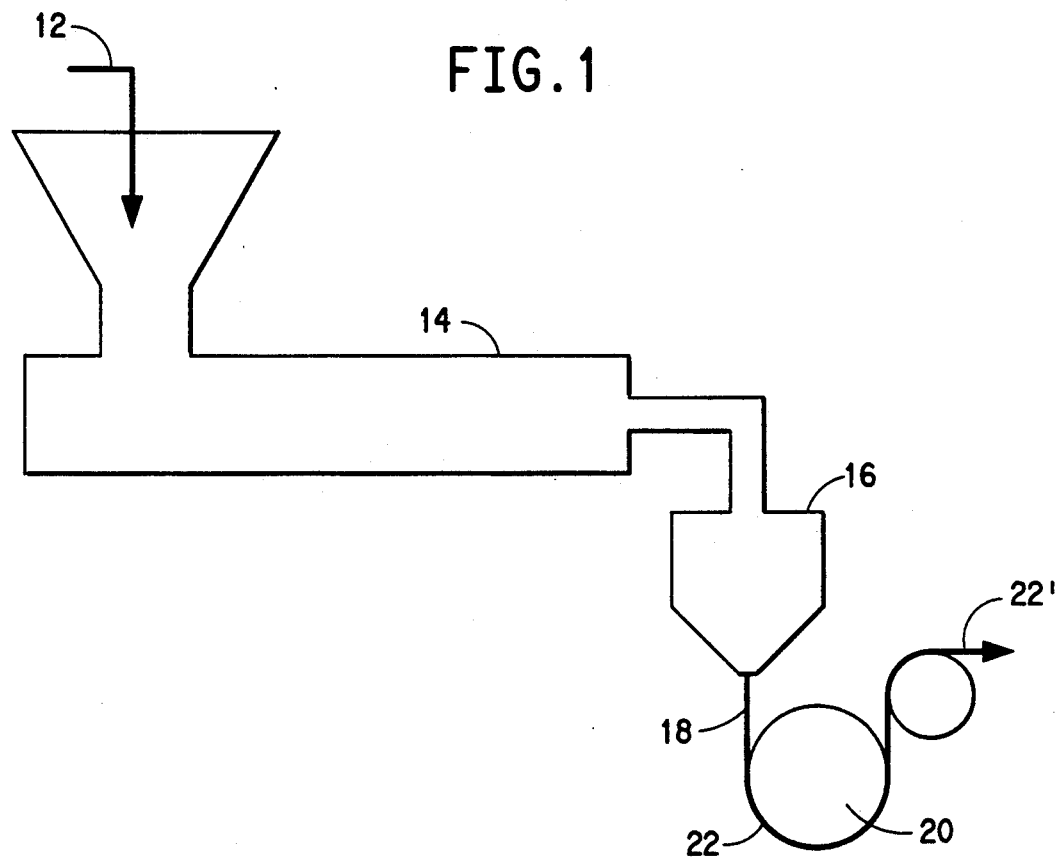
FIG. 1 illustrates the preferred extrusion process of the present invention.

Referring now to the drawings, FIG. 1 is a perspective view of the preferred extrusion process of the present invention. The process is shown generally at 10. The resin compound is combined with hard conductive particles, such as carbon black or metal fines at a weight ratio of about 97:3–70:30 resin to conductive particles and enters the process as shown at 12. As mentioned, this resin can be virtually any conventional ionomer or acid copolymer. The most preferred resin comprises poly(ethylene-comethacrylic acid partially neutralized with zinc or sodium. Other resins may also be appropriate for the present invention and ordinary skill and experimentation may be necessary in protecting any such alternative embodiment of this invention after reading this specification and accompanying claims. It is also possible to use a concentrate containing the hard conductive material and simultaneously blend with the acid copolymer or ionomer and extrude the resulting melt blend. The extruder must be capable of providing a uniform blend to accomplish this. The compounded resin is heated and forced forward by extruder 14 through extrusion die 16, thereby creating resin web 18 which is cooled by quenching rollers 20 to provide final sheet 22 and 22'.

Figure 2:
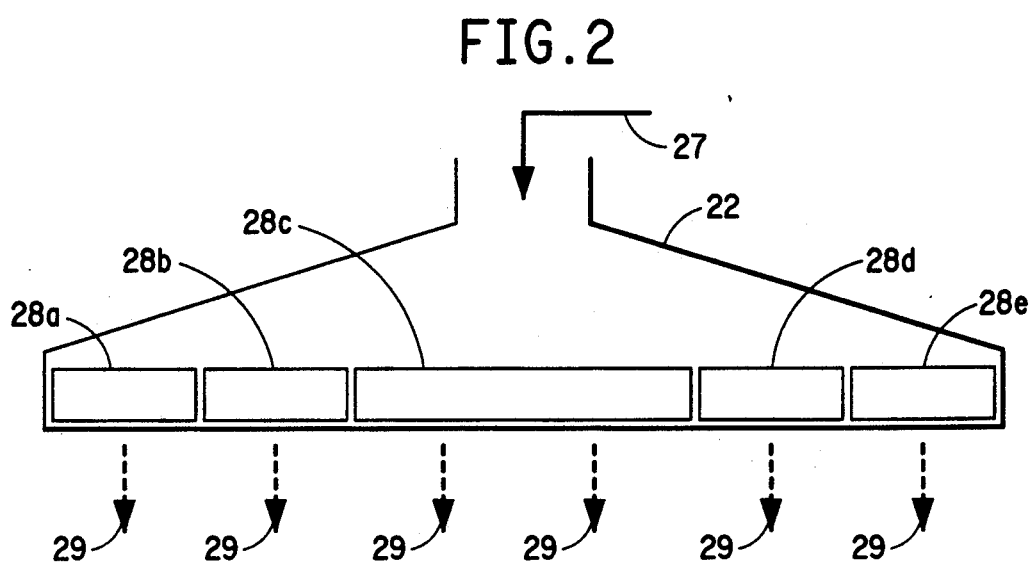
FIG. 2 illustrates the extrusion die of FIG. 1.

FIG. 2 further illustrates extrusion die 22, containing five heating zones, 28a, 28b, 28c, 28d, and 28e. Molten resin 27 enters the extrusion die 22 and exits the die as a melt curtain 29. The outer, non-planar extrusion die zones 28a and 28e are heated to a temperature about 3° C. to about 50° C. higher than die heating zone 28c. Transition heater zones 28b and 28d are heated to an intermediate temperature between the temperature of zone 28c and zones 28a and 28e. Temperature adjustment is made to maintain uniformity of the surface resistivity.

The present invention is further exemplified by the following examples.

EXAMPLES

The following compositions were used:
COMPOSITION 1: Poly(ethylene-comethacrylic acid) ionomer-resin partially neutralized with zinc containing 3.5% by weight carbon black.
COMPOSITION 2: Poly(ethylene-comethacrylic acid) ionomer-resin partially neutralized with zinc containing 4% carbon black.

CONTROL EXAMPLE

COMPOSITION 1 was compounded on a Farrel Continuous Mixer and subsequently cast into a 1524 mm wide 51 μm film. The cast film was produced on a 63.5 mm single screw Sterling Extruder using a general purpose screw and a coat-hanger-design die with 5 heater zones.

Extrusion conditions for the cast film are as follows, temperatures noted in °C.

| Extruder Zones Temp | | | | Die Zones Temp | | | | | Die ADAP | Screw RPM | Take Off M/Min | Quench Rolls | |
|---|---|---|---|---|---|---|---|---|---|---|---|---|---|
| 1 | 2 | 3 | 4 | 1 | 2 | 3 | 4 | 5 | | | | CTR | Bott |
| 198 | 198 | 204 | 200 | 185 | 182 | 181 | 185 | 183 | 180 | 30 | 3.0 | 18 | 15 |

Surface resistivity of the cast film was measured using a Keithly Model 617 resistivity meter equipped with #6105 sample chamber at a constant 100 volts. Readings measured from $10^6$ at the center of the film to as high as $10^{15}$ at the edges. The center 610 mm portion of the film was static dissipative within specifications but uniformity across entire width was not obtained. Results are given below:

| Positions of Center of 102 mm Dia. Samples From Left, mm | 102 | 292 | 457 | 635 | 787 | 940 | 1105 | 1245 | 1372 |
|---|---|---|---|---|---|---|---|---|---|
| Log of Surf. Resist. In OHMS/Square | | | | | | | | | |
| Side 1 | 13.1 | 14.3 | 8.6 | 6.9 | 7.0 | 9.1 | 12.1 | 12.1 | 13.4 |
| Side 2 | 15.0 | 15.9 | 8.3 | 6.7 | 6.9 | 8.8 | 14.4 | 14.5 | 13.2 |

EXAMPLE

COMPOSITION 2 was compounded on a Farrel Continuous Mixer was subsequently cast into a 1524 mm wide 51 μm film using the same equipment as described in the control EXAMPLE. For this run there were variances in the temperature profile of the die as noted in the following extrusion conditions, temperatures noted in °C.

| Extruder Zones Temp | | | | Die Zones Temp | | | | | Die ADAP | Screw RPM | Take Off M/Min | Quench Rolls | |
|---|---|---|---|---|---|---|---|---|---|---|---|---|---|
| 1 | 2 | 3 | 4 | 1 | 2 | 3 | 4 | 5 | | | | CTR | Bott |
| 170 | 180 | 180 | 180 | 215 | 205 | 190 | 210 | 215 | 185 | 30 | 3.6 | 21 | 18 |

Surface resistivity of the cast film was measured using the same equipment as in the CONTROL EXAMPLE. Readings measured $10^5$ to $10^6$ across the entire width of the film. By adjusting the die temperatures to be hotter at the edges and cooler at the center uniform resistivity was obtained. Results are given below.

| Positions of Center of 102 mm Dia. Samples From Left, mm | 102 | 254 | 406 | 559 | 711 | 864 | 1016 | 1168 | 1321 | 1422 |
|---|---|---|---|---|---|---|---|---|---|---|
| Log of Surf. Resist. In OHMS/Square | | | | | | | | | | |
| Side 1 | 6.0 | 6.1 | 6.1 | 6.2 | 6.1 | 6.0 | 5.9 | 6.0 | 5.9 | 6.0 |
| Side 2 | 5.9 | 6.2 | 6.2 | 6.1 | 6.1 | 6.0 | 6.0 | 6.1 | 6.0 | 6.1 |

Further examples are provided in TABLES I, II, III, and IV in which Composition 1 and 2 were prepared on a #4 Farrel Continuous Mixer ("FCM"), using #15 mixing blades at 320 rpm, mixing chamber set at 161° C., orifice at 90% open and a rate of 273 kg/hr. The FCM discharges to a 127 mm single screw extruder set up with an eighty hole die (2.36 mm hole dia.), of which the twenty-eight perimeter holes were blocked off. The extruder and die were operated at 184° to 195° C. Polymer exiting from the die is underwater cut and water conveyed to a Gayla Spinner Dryer.

These blends were subsequently cast into 152 mm, 51 μm film using a Haake 19 mm single screw extruder with a 152 mm horizontal coat hanger design film die.

Table 1 shows extrusion conditions and surface resistivity data measured with a Monroe Electronics Model 262A portable surface resistivity meter and the Keithly Model 617 meter equipped with #6105 sample chamber at a constant 100 volts.

Based upon Table I, it is evident that carbon loading, melt temperature, die temperature profile (based on die width), and line speed all affect the final surface resistivity of the film.

Films were made from COMPOSITION 1 and COMPOSITION 2 described above. Equipment used was a 89 mm Prodex single screw extruder set up with a general purpose screw and a 1219 mm five heater zone vertical film die. The film was extrusion coated to the polypropylene surface of a polypropylene/paper substrate. The following conditions were kept constant: film curtain was 7.6 mm from the center of the nip towards the paper roll, an air gap of 102 mm, a nip pressure of 0.0069 MPa, and extrusion temperature profiles as defined in Table II. Surface resistivity measured across the entire width of the film was performed during production using a Monroe model 262A portable meter. These data along with extruder melt, pressure, screw rpm, and film line speed are shown in Table III. More accurate surface resistivity measurements were made using a Keithly model 617 with #6105 sample chamber and constant 100 volts. Measurements were made at five locations across the width of the films and reported in Table IV using the same sample designation as in Table III.

TABLE I

| BLEND | MELT TEMP °C. | EXT. RPM | QUENCH ROLL °C. | FILM TAKEOFF M/MIN | (SURFACE RESISTIVITY) | | |
|---|---|---|---|---|---|---|---|
| | | | | | MONROE 262A | KEITHLY 50% RH LOG OF SR IN OHMS/SQ | |
| | | | | | | SIDE 1 | SIDE 2 |
| COMP. 1 | 211 | 20 | 20 | 2.1 | 10 8 | 7.5 | 7.2 |
| " | 198 | 20 | 20 | 2.1 | 10 12 | 15.3 | 15.3 |
| COMP. 2 | 190 | 20 | 20 | 2.1 | 10 10 | 9.5 | 10.5 |
| " | 200 | 20 | 20 | 2.1 | 10 7 | 7.1 | 7.0 |
| " | 210 | 70 | 20 | 7.0 | 10 9 | 11.3 | 8.6 |
| " | 218 | 95 | 20 | 9.1 | 10 8 | 7.9 | 6.9 |

TABLE II

| TEMP. PROF. | (EXTRUDER TEMP. PROFILE, °C.) | | | | | | (DIE TEMP. PROFILE, °C.) | | | | |
|---|---|---|---|---|---|---|---|---|---|---|---|
| | Z1 | Z2 | Z3 | Z4 | Z5 | ADAPTER | Z1 | Z2 | Z3 | Z4 | Z5 |
| A | 188 | 188 | 193 | 199 | 204 | 210 | 227 | 221 | 221 | 221 | 227 |
| B | 188 | 188 | 199 | 207 | 207 | 216 | 232 | 227 | 227 | 227 | 232 |

TABLE III

| SAMPLE ID. | TEMP PROF. | EXT. MELT °C. | EXTR. PRESS. MPa | SCREW RPM | CHILL ROLL °C. | FILM TAKEOFF M/MIN | RESISTIVITY MONROE 262A |
|---|---|---|---|---|---|---|---|
| 1. COMP. 1 | A | 198 | — | 12 | 21 | 6.1 | 10 6 |
| 2. COMP. 1 | A | 203 | 16.5 | 20 | 22 | 15.2 | 10 9 |
| 3. COMP. 2 | A | 204 | — | 20 | 20 | 15.2 | 10 6 |
| 4. COMP. 2 | A | 210 | 28.3 | 40 | 22 | 30.5 | 10 8 |
| 5. COMP. 2 | A | 213 | 28.9 | 50 | 22 | 38.1 | 10 9 |
| 6. COMP. 2 | A | 216 | 30.3 | 60 | 23 | 45.7 | 10 10 |
| 7. COMP. 2 | B | 214 | 23.4 | 30 | 18 | 22.9 | 10 6 |
| 8. COMP. 2 | B | 218 | 27.6 | 50 | 19 | 38.1 | 10 8 |
| 9. COMP. 2 | B | 220 | 28.9 | 60 | 20 | 45.7 | 10 9 |
| 10. COMP. 2 | B | 226 | 31.7 | 80 | 21 | 60.9 | 10 11 |

TABLE IV

| SAMPLE DESIG. | | LOG OF SURFACE RESIST. IN OHMS/SQUARE | POSITIONS OF THE CENTER OF 102 mm DIA. SAMPLES FROM LEFT, mm | | | | |
|---|---|---|---|---|---|---|---|
| | | | 102 | 279 | 559 | 838 | 1016 |
| 2. COMP. 1 | *SIDE 1 | | 8.6 | 8.7 | 8.4 | 8.6 | 8.7 |
| COMP. 1 | *SIDE 2 | | 12.6 | 9.8 | 9.9 | 13.0 | 13.5 |
| 4. COMP. 2 | *SIDE 1 | | 7.9 | 8.2 | 7.5 | 7.7 | 7.4 |
| COMP. 2 | *SIDE 2 | | 8.4 | 8.6 | 7.9 | 7.9 | 7.7 |
| 5. COMP. 2 | *SIDE 1 | | 9.3 | 9.9 | 8.6 | 9.0 | 8.6 |
| COMP. 2 | *SIDE 2 | | 9.6 | 10.3 | 9.1 | 9.8 | 8.9 |
| 6. COMP. 2 | *SIDE 1 | | 10.1 | 10.1 | 9.6 | 9.9 | 9.5 |
| COMP. 2 | *SIDE 2 | | 11.0 | 11.1 | 9.7 | 9.7 | 9.7 |
| 7. COMP. 2 | *SIDE 1 | | 6.4 | 6.4 | 6.2 | 6.4 | 6.4 |
| COMP. 2 | *SIDE 2 | | 6.5 | 6.7 | 6.3 | 6.6 | 6.4 |
| 8. COMP. 2 | *SIDE 1 | | 7.4 | 7.6 | 7.0 | 7.2 | 7.0 |
| COMP. 2 | *SIDE 2 | | 7.8 | 8.0 | 7.2 | 7.6 | 7.4 |
| 9. COMP. 2 | *SIDE 1 | | 9.2 | 9.3 | 8.4 | 8.6 | 8.8 |
| COMP. 2 | *SIDE 2 | | 9.6 | 9.7 | 9.1 | 9.4 | 8.6 |
| 10. COMP. 2 | *SIDE 1 | | 11.3 | 11.8 | 10.5 | 11.3 | 10.5 |
| COMP. 2 | *SIDE 2 | | 11.8 | 12.0 | 11.8 | 12.5 | 11.2 |

*SIDE 1 Denotes chill roll contact (shiny side)
*SIDE 2 Denotes pp/paper contact (dull side)

What is claimed is:

1. A process for manufacturing an acid copolymer or ionomer composition having a substantially uniform electrical resistivity along its outer surface, said process comprising the steps of:

combining about 70 to about 97 weight parts of the acid copolymer or ionomer composition with about 3 to about 30 weight parts of a conductive particle, and heating the mixture until it becomes a flowable melt;

forcing the flowable melt into an extrusion cavity having a middle zone and at least two outer edge zones, where the temperature of the outer edge zones are about 3 to 50 degrees Celsius higher than the temperature of the center or middle zone and thereafter cooling the extruded melt, whereby the final composition has a substantially uniform surface resistivity in the range of from about $10^5$ to about $10^{12}$ ohms per square.

2. The process of claim 1 wherein the extrusion cavity is further defined as an extrusion die and the edge zone temperatures are about 4 to about 40 degrees Celsius higher than the middle zone temperature.

3. The process of claim 1 wherein the edge zone temperatures are about 5 to 30 degrees Celsius higher than the middle zone temperature.

4. Process of claim 1 wherein the conductive particles are metal, carbon, semiconductive oxides or combinations thereof.

5. The process of claim 4 further defined as a coextrusion or tandom extrusion.

* * * * *